United States Patent
Davies

[11] 3,777,955
[45] Dec. 11, 1973

[54] LIQUID CONTAINER-TOOL OR ACCESSORY BOX FOR BICYCLES

[76] Inventor: Brian W. Davies, 6200 Barton Rd., North Olmsted, Ohio 44070

[22] Filed: Sept. 28, 1972

[21] Appl. No.: 293,015

[52] U.S. Cl. .................... 224/35, 280/289, 220/23
[51] Int. Cl. .............................................. B62j 39/00
[58] Field of Search ................... 224/35, 32 R, 36, 224/30 R, 30 A, 32 A, 34; 280/289, 202; 220/20, 23

[56] References Cited
UNITED STATES PATENTS
2,051,823   8/1936   Clarke .................................. 224/35
1,400,967   12/1921  Merkel ................................. 224/35

FOREIGN PATENTS OR APPLICATIONS
29,991   7/1922   Denmark .............................. 224/35

Primary Examiner—Robert J. Spar
Assistant Examiner—Kenneth Noland
Attorney—Walter Maky

[57] ABSTRACT

A bicycle having a simulated gas tank on the top bar thereof between the steering and seat post supports which comprises a bottom tray-like member secured to said top bar for carrying miscellaneous articles such as a bicycle lock, tools, spare bicycle parts, food articles, etc., and a detachable cover for said bottom member which is in the form of a container having a filling opening at the top and a dispensing spout at the lower rear side thereof adapted to contain water, milk, coffee, fruit juice or the like. The combination liquid container-tool or accessory box herein is further characterized in that the bottom tray-like member and the upper liquid container member have nested rim portions and are provided with resilient hook means to facilitate attachment and detachment of the liquid container member to and from the bottom tray-like member which is secured to the top bar of the bicycle. Yet another characterizing feature of this invention is that the dispensing spout is disposed at the left rear side of the liquid container so that, when the bicycle is supported on its kick stand, said dispensing spout will be located at the lowermost portion of the container for dispensing substantially the entire contents thereof without need for removing the same from the bottom tray-like member.

4 Claims, 5 Drawing Figures

PATENTED DEC 11 1973 3,777,955
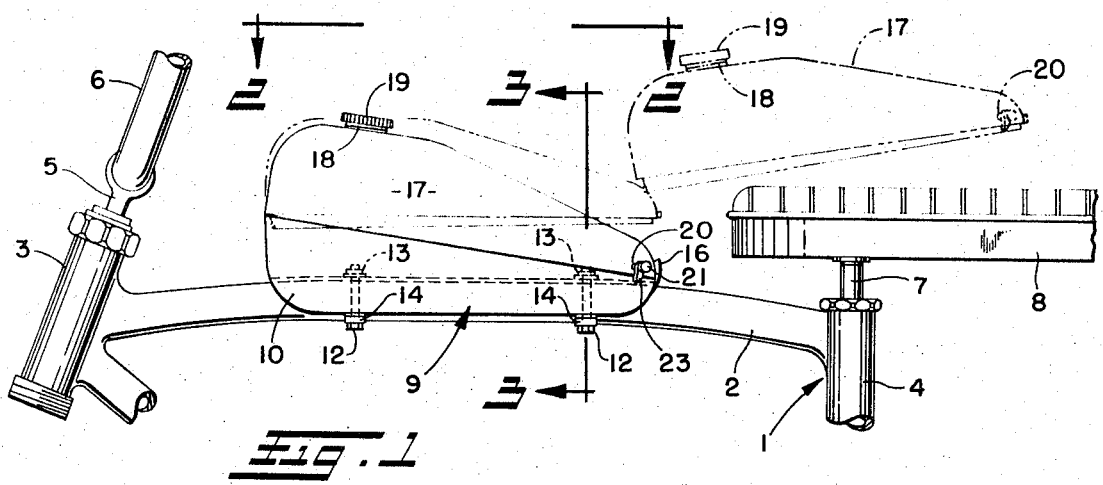
Fig. 1
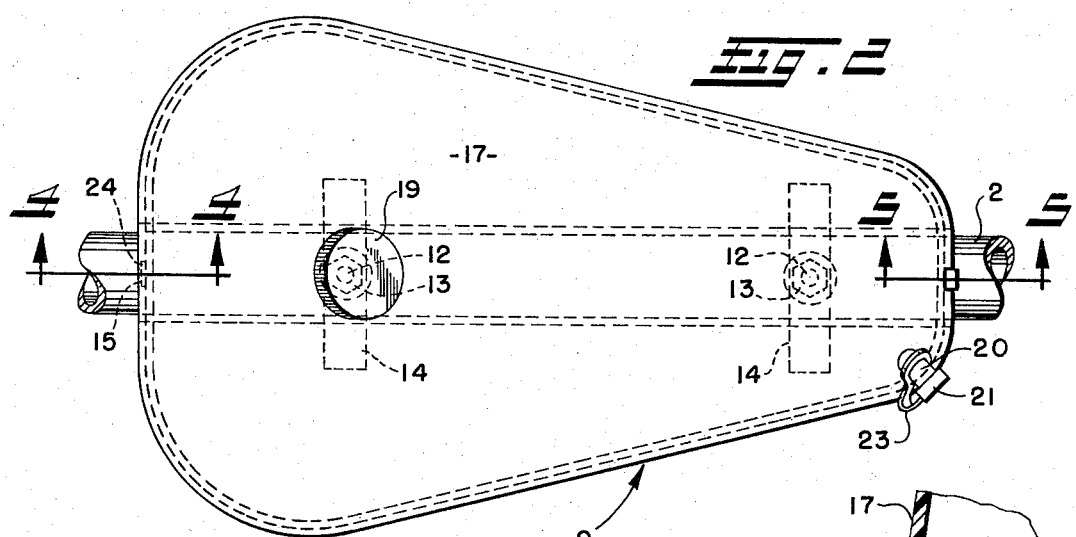
Fig. 2
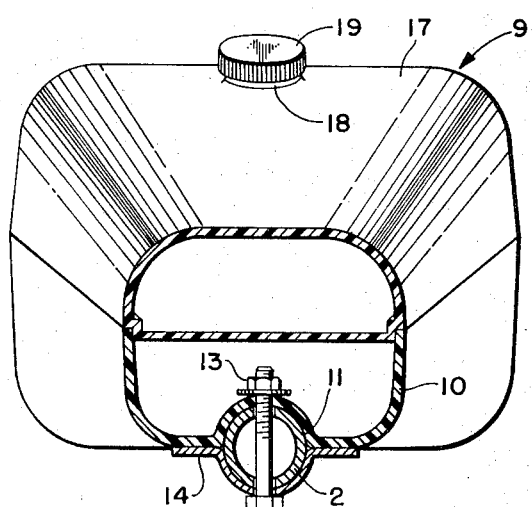
Fig. 3
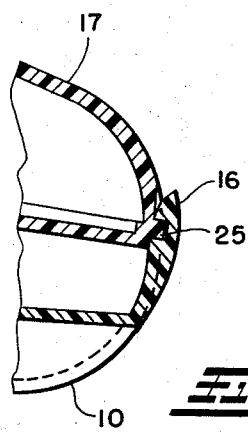
Fig. 4
Fig. 5

LIQUID CONTAINER-TOOL OR ACCESSORY BOX FOR BICYCLES

It is a principal object of this invention to provide a streamlined box for attachment to the top bar of a bicycle to simulate a gas tank, the box herein comprising a bottom tray-like member attached to the top bar of the bicycle and a detachable cover member which is in the form of a liquid container having a filling opening at the top and a dispensing spout at the lower rear side thereof, said bottom member being adapted to be used for storing miscellaneous articles including a bicycle lock, tools, spare bicycle parts or even articles of food such as sandwiches, cookies, candy bars, etc., and said cover member being adapted to contain water or other beverages.

It is another object of this invention to provide a combination liquid container-box for bicycles which may be readily and economically manufactured from thermoplastic material with integral snap locking means to enable easy detachment and attachment of the top liquid container member to the bottom tray-like member.

It is yet another object of this invention to provide a combination liquid container-box for bicycles which comprises a bottom tray-like member and a top liquid container member which when attached to the bottom tray-like member constitutes a cover therefor, said liquid container member having a filling opening at the top thereof and having a downwardly and rearwardly sloping bottom wall terminating in a dispensing spout at the lower rear side thereof for dispensing of the liquid contents therefrom when the bicycle is in an upright position or when the bicycle is supported in a tilted position by its kick stand.

In said annexed drawing:

FIG. 1 is a side elevation view of the upper portion of a bicycle having the combination liquid container-box herein secured to the top bar of the bicycle between the steering and seat posts;

FIG. 2 is a top plan view on enlarged scale as viewed along the line 2—2, FIG. 1;

FIG. 3 is a transverse cross-section view taken substantially along the line 3-3, showing how the bottom tray-like member is secured to the top bar of the bicycle and showing the nested rim portions of the bottom tray-like member and the top liquid container member; and FIGS. 4 and 5 are fragmentary cross-section views taken substantially along the lines 4—4 and 5—5 of FIG. 2.

Referring now in detail to the drawing and as best shown in FIG. 1, the bicycle frame 1 is of familiar form including a curved generally horizontally extending top bar 2 to which are secured as by welding the steering post and seat post support members 3 and 4, the steering post 5 having bicycle handlebars 6 thereon and the seat post 7 having a bicycle seat 8.

The combination liquid container-tool or accessory box 9 herein is in the general form of a streamlined gas tank for motor bikes or motorcycles, said container-box comprising a bottom tray-like member 10 having upstanding sides and formed lengthwise along its bottom with a groove 11 of generally semicircular cross-section to embrace the upper half of the top bar 2 when said bottom member 10 is secured to said top bar 2 as by means of bolts 12 and nuts 13 and strap members 14 which embrace the lower half of the top bar 2, said bolts 12 extending through holes drilled through the top bar 2. The upper edge of the bottom tray-like member 10 lies in a horizontal plane transversely of the bicycle and is inclined downwardly toward the rear of the bicycle as best shown in FIG. 1 for a purpose which will become apparent as the description proceeds. The front end of the bottom member 10 adjacent the top edge is formed with a groove 15 and the rear end of the bottom member 10 is integrally formed with a hook-like portion 16.

The top member 17 of the container-box 9 is in the form of a liquid container having a top filling opening 18 closed by the removable cap 19 and a dispensing spout 20 at its lower rear side thereof closed by a detachable cap or cork 21 which preferably is retained on the top member 17 as by an integral ring and flexible strap 23. As evident, the top member 17 constitutes a removable cover for the bottom tray-like member 10 and has at its front end a bead 24 which is adapted to snap into the groove 15 and has at its rear end a rib 25 which snaps into the integral hook portion 16 as best shown in FIGS. 4 and 5. Thus, the liquid container 17 is detachably retained on the bottom member 10 as shown in full lines in FIG. 1, but may be readily removed as shown by phantom lines in FIG. 1, by springing the hook portion 16 toward the right away from the bead 25 as viewed in FIG. 5. To maintain the container 17 and bottom member 10 in register, the bottom wall of the container 17 is inset as shown so as to nest within the upper rim portion of the bottom member 10.

It is to be noted that even when the bicycle is in a vertical position the dispensing spout 20 is in a generally horizontal position or downwardly inclined position near the lower end of the container 17 so that substantially the entire contents of the container 17 may be dispensed from the container even without removing the same from the bottom member 10. In fact, when the bicycle is supported in an inclined position by its kick stand (not shown) the spout 20 will be further tilted downwardly so that practically the entire contents of the container 17 may easily be dispensed.

The container 17 herein serves as a cover for the bottom tray-like member 10 and when said container 17 is detached, the bottom member 10 may be loaded with articles of any character including a bicycle lock, a length of bicycle chain, tools or even articles of food which are retained therein when the container 17 is snapped back into place.

Since the container 17 may be removed from the bottom member 10 it may be readily washed in the kitchen sink and filled with water or other beverage and taken out and snapped into place on the bottom member 10 ready for use or transport.

The liquid container 17 and bottom member 10 may be economically molded from thermoplastic material of any desired color to match or harmonize the color of the bicycle and will have a smooth and attractive surface to simulate the streamline and enameled gas tanks as employed on motor bikes or motorcycles. Moreover, thermoplastic materials have a lower heat conductivity than metals and hence beverages will remain hot or cold for substantial periods of time. Of course, if superior heat or cold holding properties are desired, the container 17 may be made of heat insulating double wall construction or of material such as foamed plastic with or without a thermoplastic reinforcing shell.

The embodiments of the invention in which an exclusive property or privilege is claimed are defined as follows:

1. In combination a bicycle having a top bar extending between the steering post and seat post supports thereof; a bottom upwardly opening tray-like member located above and secured to the top of said top bar; and a cover member detachably secured to the top of said bottom member to form a closed compartment in said bottom member; said cover member being in the form of a closed liquid container having an opening from which the contents of said container may be dispensed.

2. The combination of claim 1 wherein the meeting edges of said members are inclined downwardly toward the rear of the bicycle; and wherein said opening is located adjacent the lower rear end of said container to enable dispensing of substantially the entire contents of said container while said container is attached to said bottom member.

3. The combination of claim 1 wherein said bottom member is formed with a longitudinal groove along its bottom to embrace said top bar thus to maintain said bottom member in alignment with said top bar.

4. The combination of claim 1 wherein the upper rim of said bottom member and the periphery of the bottom wall of said container are nested together to retain them in registry.

* * * * *